(12) United States Patent
Ishino et al.

(10) Patent No.: US 8,114,452 B2
(45) Date of Patent: Feb. 14, 2012

(54) DEAERATED PACKAGED FROZEN SUSHI, PROCESS FOR PRODUCING THE SAME AND METHOD OF COOKING

(75) Inventors: Yuji Ishino, Ishikawa (JP); Hironobu Kadoya, Ishikawa (JP)

(73) Assignee: Polar Star Co., Ltd. (JP)

( * ) Notice: Subject to any disclaimer, the term of this patent is extended or adjusted under 35 U.S.C. 154(b) by 0 days.

(21) Appl. No.: 11/817,285

(22) PCT Filed: Mar. 1, 2006

(86) PCT No.: PCT/JP2006/304416
§ 371 (c)(1),
(2), (4) Date: Aug. 28, 2007

(87) PCT Pub. No.: WO2006/093318
PCT Pub. Date: Sep. 8, 2006

(65) Prior Publication Data
US 2009/0035422 A1 Feb. 5, 2009

(30) Foreign Application Priority Data
Mar. 2, 2005 (JP) .................. 2005-058260

(51) Int. Cl.
*A21D 10/02* (2006.01)
(52) U.S. Cl. ........ 426/107; 426/396; 426/426; 426/129; 426/234; 426/393; 426/412; 426/394; 426/126; 426/404; 426/113
(58) Field of Classification Search .................. 426/107, 426/112, 113, 114, 126, 129, 234, 392, 393, 426/394, 396, 404, 412, 520, 524, 643
See application file for complete search history.

(56) References Cited

U.S. PATENT DOCUMENTS
5,230,914 A * 7/1993 Akervik .................. 426/107
(Continued)

FOREIGN PATENT DOCUMENTS
JP        57-063082        4/1982
(Continued)

OTHER PUBLICATIONS
JP2005047550abstractnpl.*
(Continued)

*Primary Examiner* — Drew Becker
*Assistant Examiner* — Preston Smith
(74) *Attorney, Agent, or Firm* — Ostrolenk Faber LLP

(57) ABSTRACT

There is provided a microwavable vacuum-packed frozen sushi product comprising: a flexible plastic packing bag which is vacuumed to a pressure of 50 to 600 mmHg and, in the pressure-reduced state, hermetically sealed; an open-topped plastic box placed in the plastic packing bag; a laminated metal foil placed on the bottom of the plastic box; and a sushi product placed in the plastic box with its sushi material or materials in contact with the laminated metal foil; the microwavable vacuum-packed frozen sushi product being such that an inner surface of the plastic packing bag is in contact with a rice section of the sushi product; and the plastic packing bag, the plastic box, the laminated metal foil and the sushi product are frozen together in a unified form, in which water vapor emanating from the sushi product in the thawing flow through a space formed around the sushi product to effect heating of the rice section and the sushi material or materials of the sushi product, thereby diminishing temperature unevenness in the sushi product after the thawing, and which is suitable for mass production.

12 Claims, 7 Drawing Sheets

U.S. PATENT DOCUMENTS

| | | | | |
|---|---|---|---|---|
| 5,370,895 A | * | 12/1994 | Doerter | 426/573 |
| 5,861,184 A | * | 1/1999 | Ishino et al. | 426/107 |
| 5,863,578 A | * | 1/1999 | Guarino | 426/113 |
| 5,945,152 A | * | 8/1999 | Purser | 426/646 |

FOREIGN PATENT DOCUMENTS

| | | | |
|---|---|---|---|
| JP | 361257147 | * | 11/1986 |
| JP | 05-184314 | | 7/1993 |
| JP | 07000096 | * | 1/1995 |
| JP | 8-214805 | | 8/1996 |
| JP | 8-317764 | | 12/1996 |
| JP | 9-47242 | | 2/1997 |
| JP | 2001-275591 | | 10/2001 |
| JP | 2005047550 | * | 2/2005 |

OTHER PUBLICATIONS

JP361257147abstractnpl.*
JP07000096abstractnpl.*
Polypropylenevsnylon,1996.*

* cited by examiner

US 8,114,452 B2

DEAERATED PACKAGED FROZEN SUSHI, PROCESS FOR PRODUCING THE SAME AND METHOD OF COOKING

CROSS REFERENCE TO RELATED APPLICATION

The present application is a 35 U.S.C. §§371 national phase conversion of PCT/JP2006/304416, filed Mar. 1, 2006, which claims priority of Japanese Patent Application No. 2005-058260, filed Mar. 2, 2005, the disclosure of which has been incorporated herein by reference. The PCT International Application was published in the Japanese language.

TECHNICAL FIELD

The present invention relates to a packed frozen sushi product suitable for thawing, and more particularly, it relates to a packed frozen sushi product suitable for thawing by means of a microwave oven. The present invention also relates in particular to a vacuum-packed frozen sushi product capable of being thawed by a microwave oven while shielding a sushi material or materials, which should not be heated to a high temperature of 40° C. or higher, from microwaves in the microwave oven with a laminated metal foil. Further, the present invention relates to a packed frozen sushi product suitable for thawing by means of a microwave oven, in which a sushi product prepared by topping a shaped rice section with a sushi material or materials that should not be heated to a temperature as high as 40° C. or higher is contained in a plastic packing box with its sushi material or materials in contact with a laminated metal foil, and the sushi product is placed in a packing bag made of a plastic film together with the box, and the packing bag is vacuumed so that the sushi product is in tight contact with the plastic film of the packing bag in the vacuumed condition, and the resultant is frozen in a unified form.

BACKGROUND ART

In the case of, for example, a rod-shaped sushi product (bou-zushi) or the like, vinegared rice is shaped, and the shaped rice section is topped with a sushi material or materials such as boned and prepared sea bream, sockeye salmon or mackerel together with a thin slice of kombu kelp (shiroita kombu) cooked in a broth seasoned with vinegar, sugar and salt, and resultant is shaped into any of various shapes such as the rod-shape. The shaped sushi product is wrapped with a bamboo sheath and placed in a packing bag made of a plastic film and vacuum-packed, the vacuum-packed sushi product is frozen with a brine such as ethanol, or the shaped sushi product is frozen by slow freezing such as air-blast freezing or nitrogen or carbon dioxide freezing, and the frozen shaped sushi product is placed in a packing bag made of a plastic film and vacuum-packed, to thereby prepare a vacuum-packed frozen sushi product.

Since such a packed frozen sushi product prepared by means of brine freezing is vacuum-packed prior to the freezing, it is free from attachment of bacteria and absorption of odor from the coolant gas in a freezing room. Therefore, it is hygienically superior to, for example, a packed frozen sushi product prepared by vacuum-packing a sushi product posterior to freezing of the sushi product by slow freezing such as air-blast freezing, nitrogen or carbon dioxide freezing. In particular, such a packed frozen sushi product frozen by brine freezing can be frozen-stored stably, for example, over a period as long as 3 months or longer when stored at a storage temperature of −18° C., or can be stored for 6 months or longer when stored at a storage temperature of −50° C.

However, a packed frozen sushi product which has been frozen-stored in such a manner is thawed and then served. Methods for thawing such a packed frozen sushi product include natural thawing, running water thawing, steam thawing, hot water thawing and microwave thawing. Of these, microwave thawing is suitable for thawing of a frozen sushi product or the like because of its extremely short thawing time and high thawing yield. For example, in the case of the rod-shaped sushi product as described above, it takes five hours for thawing at room temperature to thaw the rod-shaped sushi product, whereas microwave thawing enables the rod-shaped sushi product to be thawed in 4 minutes. Accordingly, microwave thawing is capable of instantly responding to demands and thus convenient as compared with thawing at room temperature (see Japanese Unexamined Patent Publication No. Hei 8 (1996)-214805, Japanese Unexamined Patent Publication No. Hei 8 (1996)-317764, Japanese Unexamined Patent Publication No. Hei 9 (1997)-47242, Japanese Unexamined Patent Publication No. 2001-275591 and the specification of U.S. Pat. No. 5,861,184).

However, in the case of microwave thawing, calorific values derived from microwave absorption are different between a sushi material or materials and a rice section, and the sushi material or materials and the rice section are also different in quantity. Further, because a surface portion of the sushi product is intensively heated as compared with a center portion, a portion of the sushi material or materials is heated to an undesirably high temperature as compared with the rice section. The sushi material or materials are thereby brought into the so-called cooked state, and the tastes thereof are impaired. Therefore, microwave thawing has not been practically used. Further, in the case of, for example, a rod-shaped sushi product, a rice section is preferably lukewarm, for example, the rice section preferably has temperatures of 15 to 25° C., more preferably 15 to 20° C., whereas a sushi material or materials is preferred to have temperatures lower than those of the rice section, for example, temperatures of 10 to 25° C., more preferably 10 to 20° C. However, when a packed frozen sushi product is thawed by means of a microwave oven, a sushi material or materials are heated to relatively high temperatures to impair the taste of the sushi product. Accordingly, it has been difficult to effect desired thawing by means of a microwave oven. Under such circumstances, with a view to solving the problem that in thawing of a packed frozen sushi product by means of electromagnetic wave heating with a microwave oven or the like, the sushi material or materials of the sushi product are heated to relatively high temperatures to thereby impair taste of the sushi product, the present inventors have proposed a so-called packed frozen sushi product suitable for frozen storage which is prepared by wrapping a sushi product topped with a sushi material or materials with a plastic wrapping film, placing a metal foil over the sushi material or materials, further wrapping the resultant with a plastic wrapping film, placing the wrapped sushi product in a plastic film packing bag for frozen foods, vacuuming and hermetically seal the packing bag to hermetically pack the sushi product, and freezing the resultant in the hermetically packed state in whole by brine-freezing in a unified form.

In the case of such a packed frozen sushi product, where a plastic wrapping film is placed over the sushi material or materials, and a metal foil is placed thereon, and the above-mentioned rice section and the sushi material or materials are together wrapped by a plastic wrapping film, in thawing by means of electromagnetic heating with a microwave oven or the like, the rice section which is covered with no metal foil and exposed to microwave irradiation is heated with microwaves, whereas the sushi material or materials on which the metal foil is disposed and which is thereby shielded from microwaves are left unheated with microwaves and remain substantially frozen. However, water vapor is generated from the rice section heated by the heating of the rice, and the water vapor generated permeates the inside of the plastic wrapping film to heat the contents wrapped in the plastic wrapping film by steaming during the heating in a microwave oven and even after removal of the wrapped sushi product from the microwave oven, thereby bringing the rice to a lukewarm temperature and heating the sushi material or materials to a temperature of approximately 10° C.

The packed frozen sushi product, which is wrapped with a plastic wrapping film with the metal foil placed covering a surface or surfaces of the sushi material or materials to prevent the sushi material or materials from being heated by microwaves as described above, is steamed by the water vapor generated in thawing, and therefore, it is suitable for thawing by means of a microwave oven. However, the packed frozen sushi product which is wrapped with a plastic wrapping film with the metal foil placed on the sushi material or materials requires such a procedure that the metal foil is placed on the sushi material or materials of the frozen sushi product wrapped with the first plastic wrapping film, and the resultant is wrapped with the second plastic wrapping film to electrically isolate the metal foil from the surroundings, with a view to preventing electric discharge from occurring from the ends of the metal foil at the time of microwave irradiation. Further, when the wrapping with the second wrapping film is performed, the metal foil is required to be placed on the sushi material or materials of the frozen sushi product without misalignment, and the sushi product is required to be placed on the plastic wrapping film and wrapped air-tightly. Any of these procedures in the preparation of the packed frozen sushi product wrapped with the plastic wrapping films require carefulness and skill, and thus make a problem that it is difficult to realize mass production. For responding to customers' demands, the packed frozen sushi product wrapped with the plastic wrapping film has a problem because it requires many hands and much time.

It is an object of the present invention to provide a packed frozen sushi product which is capable of solving the problems inherent in the frozen sushi product wrapped with plastic wrapping films and which is thus suitable for thawing by means of a microwave oven.

The present inventors have found that by placing a sushi product such as a rod-shaped sushi product in a box, placing the sushi product in a flexible packing bag together with the box, and vacuuming the packing bag, the flexible packing bag is pushed by external pressure and brought in tight contact with outer and inner surfaces of the box and an exposed outer surface of the sushi product, i.e., an outer surface uncovered with the box and can be sealed in such an internal volume-diminished condition, and by virtue thereof, when the packed sushi product is heated by means of a microwave oven, a sushi material or materials can be heated by steaming.

DISCLOSURE OF INVENTION

The present invention has been made with a view to providing a packed frozen sushi product which is capable of being mass-produced and suitable for thawing by means of a microwave oven.

In other words, the present invention resides in a microwavable vacuum-packed frozen sushi product comprising:

a flexible plastic packing bag which is vacuumed to a pressure of 50 to 600 mmHg and, in the pressure-reduced state, hermetically sealed;

an open-topped plastic box placed in the plastic packing bag;

a laminated metal foil placed on the bottom of the plastic box; and a sushi product placed in the plastic box with its sushi material or materials in contact with the laminated metal foil;

the microwavable vacuum-packed frozen sushi product being such that an inner surface of the plastic packing bag is in contact with a rice section of the sushi product; and the plastic packing bag, the plastic box, the laminated metal foil and the sushi product are frozen together in a unified form.

Further, the present invention resides in a microwavable vacuum-packed frozen sushi product comprising:

a flexible plastic packing bag which is vacuumed to a pressure of 50 to 600 mmHg and, in the pressure-reduced state, hermetically sealed;

an open-topped plastic box placed in the plastic packing bag;

a laminated metal foil placed on the bottom of the plastic box; and a sushi product placed on the laminated metal foil with its sushi material or materials in contact with the laminated metal foil;

the microwavable vacuum-packed frozen sushi product being such that an inner surface of the plastic packing bag is in contact with a rice section of the sushi product; and the plastic packing bag, the plastic box, the laminated metal foil and the sushi product are frozen together in a unified form; and a space present around the sushi product in the packing bag in the pressure-reduced state has a volume 0.1 to 0.7 times that of the sushi product.

In the microwavable vacuum-packed frozen sushi products according to the present invention, the laminated metal foil may be provided with portions upward extending from the bottom of the plastic box in the longitudinal direction or the width direction or the longitudinal and width directions. Further, the plastic box may be a box-, cylinder-, tray- or dish-like container having a square shape, a round shape or an ellipse shape when viewed in a plan. Further, one or more sushi products may be placed in the plastic box. Moreover, the microwave-safe plastic packing bag may be made of a laminated film composed of a nylon film and a polypropylene film having a thickness larger than that of the nylon film.

The present invention also resides in a method for preparing a packed frozen sushi product, the method comprising:

disposing a sushi material or materials on a top of a shaped rice section to prepare a sushi product;

placing the prepared sushi product in a plastic box, in which a laminated metal foil is placed on the bottom thereof, with its sushi material or materials down so as to put the sushi material or materials on and in contact with the laminated metal foil;

placing the plastic box containing the sushi product in a flexible plastic packing bag;

vacuuming the packing bag to a pressure of 50 to 600 mmHg and hermetically sealing the vacuumed packing bag to prepare a vacuum-packed sushi product; and cooling the vacuum-packed sushi product with a refrigerant cooled to a freezing temperature to freeze the packing bag, the laminated metal foil and the sushi product of the vacuum-packed sushi product together in a unified form.

Further, the present invention resides in a method for preparing a packed frozen sushi product, the method comprising:

disposing a sushi material or materials on a top of a shaped rice section to prepare a sushi product;

placing the prepared sushi product in a plastic box, in which a laminated metal foil is placed on the bottom thereof, with its sushi material or materials down so as to put the sushi material or materials on and in contact with the laminated metal foil;

placing the plastic box containing the sushi product in a flexible plastic packing bag;

vacuuming the packing bag to a pressure of 50 to 600 mmHg and hermetically sealing the vacuumed packing bag to prepare a vacuum-packed sushi product with a space formed in the vacuum-packed sushi product around the sushi product in a volume 0.1 to 0.7 times that of the sushi product excusive of those of the plastic box and the laminated metal foil; and cooling the vacuum-packed sushi product with a refrigerant cooled to a (predetermined) freezing temperature to freeze the packing bag, the laminated metal foil and the sushi product of the vacuum-packed sushi product together in a unified form.

In the methods for preparing a packed frozen sushi product according to the present invention, the vacuuming is preferably performed under a pressure in a range of 140 to 400 mmHg. The plastic box may be a box-, cylinder-, tray- or dish-like container having a square shape, a round shape or an ellipse shape when viewed in a plan.

Moreover, the present invention resides in a method for cooking a vacuum-packed frozen sushi product by means of microwave heating, the method comprising:

applying heat to a microwavable vacuum-packed frozen sushi product comprising: a flexible plastic packing bag which is vacuumed to a pressure of 50 to 600 mmHg, preferably 150 to 350 mmHg and, in the pressure-reduced state, hermetically sealed, and which may be made of a laminated film composed of a nylon film and a propylene film having a thickness larger than that of the nylon film; an open-topped plastic box placed in the plastic packing bag which may be a box-, cylinder-, tray- or dish-like container having a square shape, a round shape or an ellipse shape when viewed in a plan; a laminated metal foil placed on the bottom of the plastic box; and a sushi product placed in the plastic box with its sushi material or materials in contact with the laminated metal foil; the microwavable vacuum-packed frozen sushi product being such that an inner surface of the plastic packing bag is in contact with a rice section of the sushi product; and the plastic packing bag, the plastic box, the laminated metal foil and the sushi product are frozen together in a unified form; and a space present around the sushi product in the packing bag in the vacuumed and frozen state has a volume 0.1 to 0.7 times that of the sushi product, by microwave heating to thereby bring temperatures of exposed sides of the shaped rice section to 50° C. or higher, followed by termination of the microwave heating; and allowing the resulting packed sushi product to stand in a room or water or to stand in a room and then in water within a period of 30 minutes or shorter without unpacking to generate water vapor in the packing bag, thereby steaming the shaped rice section and the sushi material or materials to bring temperatures thereof to 10° C. or higher.

The packed frozen sushi product of the present invention comprises:

a flexible plastic packing bag which is vacuumed to a pressure of 50 to 600 mmHg and, in the pressure-reduced state, hermetically sealed; an open-topped plastic box placed in the plastic packing bag; a laminated metal foil placed on the bottom of the plastic box; and a sushi product placed on the laminated metal foil with its sushi material or materials in contact with the laminated metal foil; wherein an inner surface of the plastic packing bag is in contact with a rice section of the sushi product; and the plastic packing bag, the plastic box, the laminated metal foil and the sushi product are frozen together in a unified form; and a space present around the sushi product in the packing bag in the pressure-reduced state has a volume 0.1 to 0.7 times that of the sushi product. Accordingly, the packed frozen sushi product can be thawed in a relatively short time with ease by heating it using a microwave oven, and allowing the resultant to stand in a room or water or to stand in a room and then in water, and thus the sushi product such as a boxed sushi product can simply be served. As described above, the packed frozen sushi product of the present invention can be cooked simply and easily. Accordingly, by freezing and storing boxed sushi products using a seasonal sushi material or materials, it is possible to provide boxed sushi products using a seasonal sushi material or materials irrespective of season.

Further, in the present invention, the sushi product of the vacuum-packed frozen sushi product of the present invention is placed in the box, in which the laminated metal foil is disposed on the bottom thereof, with its sushi material or materials down and in contact with the laminated metal foil. The box containing the sushi product is placed in the flexible packing bag, and the flexible packing bag is vacuumed to a pressure of 50 to 600 mmHg. In the vacuuming process, peripheral portions of the laminated metal foil are raised and adheres to the rice section by adhesive force of the rice section. In this manner, the sushi material or materials are covered with the laminated metal foil in the course of the preparation of the vacuum-packed sushi product. Accordingly, microwaves emitted toward the sushi material or materials are shielded by the laminated metal foil, and thus the sushi material or materials are prevented from being heated. However, the rice section is directly irradiated with microwaves emitted toward the rice section and heated. In the present invention, since the space in the vacuumed state is formed around the sushi product, water vapor emanating from the rice section permeates the space to heat the sushi product. In addition, since the space in the vacuumed state is defined by the box and the packing bag, by setting the vacuum pressure lower, even if water vapor having a temperature exceeding 50° C. is generated, breakage of the packing bag is not caused.

BEST MODE FOR CARRYING OUT THE INVENTION

Figure 1:
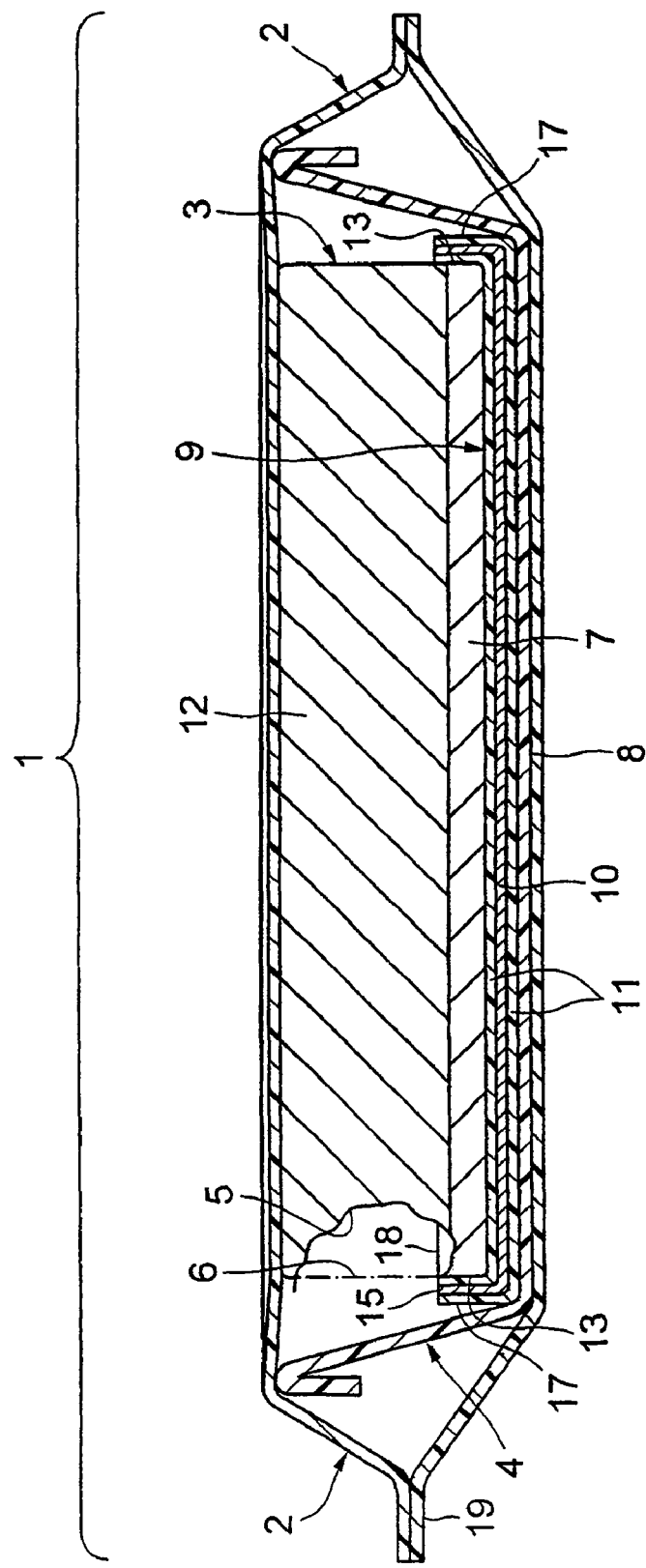
FIG. 1 is a schematic partially cutaway sectional front view schematically illustrating one Embodiment of the present invention.

In the present invention, a sushi product means a rod-shaped sushi product (bou-zushi), a pressed sushi product (oshi-zushi), a sushi product consisting of rice topped with pressed mackerel pickled in vinegar (battera) or a hand-shaped sushi product (nigiri-zushi). In the present invention, procedure for freezing a sushi product is performed by placing a sushi product with its sushi material or materials (gu or neta) down in a plastic box in which a laminated metal foil is placed on the bottom thereof, placing the sushi product-containing plastic box with its top left open in a flexible plastic packing bag, vacuuming, i.e., degassing the packing bag to a pressure of 50 to 600 mmHg, preferably 150 to 400 mmHg, more preferably 150 to 350 mmHg, and freezing the vacuumed packing bag by brine freezing, air-blast freezing, nitrogen or carbon dioxide freezing or the like. However, it is preferred from the hygienic viewpoint to prepare such a sushi product by brine-freezing the flexible plastic packing bag in which the sushi product has been placed and which has then been vacuumed because a refrigerant does not directly contact the sushi product. Further, in the present invention, the sushi products which are processed into packed frozen sushi products include sushi products of such a type that a shaped rice section is topped with a sushi material or materials, for example, a rod-shaped sushi product, a sushi product pressed in a box, i.e., a boxed sushi product (hako-zushi), a hand-shaped sushi product and the like, and one sushi product may be packed and frozen or a plurality of sushi products may be packed and frozen together. When a plurality of sushi products are placed in a box and then placed in a packing bag together with the box to prepare vacuum-packed frozen sushi products, it is preferred that each of the sushi products be so wrapped with a flexible plastic film made of a microwave-transparent material as to permit water vapor to flow through, or the sushi products be partitioned with (microwave-transparent) plastic partition pieces, thereby preventing adjacent sushi products from adhering to each other after thawing. The sushi products used in the present invention may be those which are precut so as to be separable into pieces afterward.

In the packed frozen sushi product of the present invention, each of the box and the packing bag is made of a microwave-transparent material, for example, a plastic box and a plastic packing bag or the like are used. In the present invention, when a sushi product is placed in a plastic box and packed, since a laminated metal foil is placed on the box bottom on which sushi material or materials are rested, microwaves are blocked by the laminated metal foil to prevent the sushi material or materials from being heated during heating by a microwave oven. In the present invention, the laminated metal foil may be any one so long as it is capable of blocking microwaves and causes no electric discharge between an inner wall of a microwave oven and a food. In the present invention, the laminated metal foil is one having its metal foil such as an aluminum foil entirely covered with an electrical insulating material or materials such as a plastic or one having its metal foil covered with an electrical insulating material or materials such as a plastic to such an extent that the metal foil causes no electric discharge.

In the present invention, the plastic box for containing a sushi product may have such a shape as in a generally used box, and its bottom has such a size that the sushi product formfittingly rests thereon when the sushi product is contained in the box, and its plan-, cross- and longitudinal-sectional shapes are so formed as to conform the sushi product. With a view to rendering it easy to put in and to take out the sushi product, however, it is preferred that the plastic box for containing a sushi product be so formed as to have a top opening having a width and a length which are larger than those of the bottom, i.e., the top opening be so formed as to be broader than the bottom. If the top opening of the box is so formed as to be broader than the bottom as described above, it is rendered easy to put in and to take out the sushi product, and yet a space is advantageously formed around the sushi product. In the present invention, in the flexible packing bag which is made of a plastic film and is capable of being used in heating by a microwave oven, i.e., microwave-safe, the space in a vacuumed state formed around the sushi product advantageously provides interspaces between the sushi product and the box and between the box and the packing bag because volumetric changes are slight during thawing due to the reduced pressure in the packing bag. In the present invention, in the flexible microwave-safe packing bag made of a plastic film which is vacuumed to a pressure of 50 to 600 mmHg, preferably 150 to 400 mmHg, more preferably 150 to 350 mmHg, the interspaces such as those between the box and the sushi product and between the box and the packing bag, i.e., the space formed around the sushi product permits water vapor emanating from, for example, a shaped rice section of the frozen sushi product by microwave-heating in heating of the frozen sushi product by means of a microwave oven to flow through the interspaces to heat the shaped rice section and a sushi material or materials which are thawed and at low temperatures.

In the present invention, a larger space formed around the sushi product undesirably results in a smaller steaming effect, and on the other hand, a smaller space around the sushi product undesirably takes a longer time to effect steaming. In the present invention, a size of the space formed around the sushi product is not in excess of the volume of the sushi product, and when the volume of the sushi product is supposed to be 1, the size of the space is 0.1 to 0.7, preferably 0.2 to 0.5. The ratio of the volume of the space formed around the sushi product to the volume of the sushi product when the volume of the sushi product is supposed to be 1 can be larger, if the pressure in the vacuumed packing bag is lower. In the present invention, the volume of the space formed around the sushi product in the vacuumed flexible microwave-safe packing bag made of a plastic film is that calculated by subtracting the volumes of the box and the sushi product from the volume of the inside of the vacuumed flexible microwave-safe packing bag made of a plastic film.

In the present invention, the bottom of the plastic box is a part which is brought in contact with the sushi material or materials, and the laminated metal foil is placed thereon. In the present invention, since the laminated metal foil is so provided as to cover the sushi material or materials, electric discharge between the metal foil and walls of a microwave oven or electric discharge between the metal foil and the sushi product can be prevented during thawing by means of the microwave oven. In the present invention, the plastic-laminated metal foil is provided in such a manner that it covers the sushi material or materials so as to prevent the sushi material or materials from being irradiated with microwaves. In the present invention, since the shaped rice section and the sushi material or materials are placed in a packing bag made of a plastic film and hermetically vacuum-packed, the shaped rice section and the sushi material or materials which have been once packed have such a structure that these are optimally protected from entry of ambient air, moisture or bacteria.

In the present invention, when the sushi product is thawed, for example, by a microwave oven, thawing of the shaped rice section of the sushi product is effected with heat generated by absorption of microwaves emitted by the microwave oven. Since the sushi material or materials are covered with the laminated metal foil, thawing of the sushi material or materials is effected only with heat and water vapor which emanate from the shaped rice section of the sushi product. Accordingly, in the present invention, although thawing of the packed frozen sushi product is dependent upon a weight and a storage temperature of the packed frozen sushi product, the thawing is performed, for example, by subjecting the frozen packed sushi product to microwave-heating in a microwave oven for 2.5 minutes to 5 minutes to effect thawing of the frozen shaped rice section mainly, and then, without opening the packing bag, allowing the resultant to stand, for example, in a room or water or in a room and then in water for a period of 30 minutes or shorter, preferably 20 minutes or shorter to steam and thereby heat the shaped rice section and the sushi material or materials with the water vapor emanating from the shaped rice section and to apply the heat of the shaped rice section to the sushi material or materials, thereby effecting thawing of the frozen sushi product.

In the present invention, in a case where a boxed sushi product or a rod-shaped sushi product is thawed by means of a microwave oven, a temperature distribution in the sushi product heated by the microwave oven was determined. The shaped rice section located at an upper position relative to the sushi material or materials has temperatures higher than those of the sushi material or materials because of such a positional relationship as to be located at an upper position relative to the sushi material or materials. In the shaped rice section, an upper portion has a higher temperature, and portions located nearer to corners have higher temperatures because of concentration of microwaves. Further, with respect to sides of the shaped rice section, it was found that a side having a smaller area has a temperature higher than that of a side having a larger area. In the case of a rod-shaped sushi product, the rod-shaped sushi product heated by means of a microwave oven is cut into easy-to-eat sized pieces and then served. In this connection, the shaped rice section which has just been thawed has high temperatures, and adhesion between rice grains thereof is strong. This results in difficulty in cuffing pieces therefrom, and thus the sushi product is likely to undergo deformation (during cutting) and lose its original shape. It was found, however, that when the temperatures of the shaped rice section are brought to those exceeding 10° C. and up to 30° C., preferably those exceeding 15° C. and up to 25° C., the adhesion between the rice grains of the shaped rice section is thereby moderated to enable sushi product to be cut into pieces with ease.

In the present invention, after thawing of the sushi product by microwave-heating, to make use of residual heat of the rice and heat of water vapor for heating of the sushi material or materials which remain cool, the resultant is allowed to stand without unpacking to steam the thawed sushi product in the packing bag, whereby temperatures of the sushi material or materials are raised and, in parallel therewith, temperatures of the shaped rice section are lowered. In the present invention, the space is formed around the shaped rice section in the packing bag to permit water vapor to freely flow therethrough during the thawing, whereby steaming is efficiently effected. By virtue of this, in a relatively short period of time, the temperatures of the shaped rice section can be brought to those at which cut pieces are easily separated from the sushi product to render the thawed packed frozen sushi product easy to cut into pieces. In the present invention, an inner surface of a top portion of the packing bag and a laminated metal foil, which are respectively in contact with the shaped rice section and the sushi material or materials when frozen, become out of contact with and separate from each other in the thawing to form interspaces, and water vapor permeates the thus formed interspaces to effect steaming and water vapor-heating of the shaped rice section and the sushi material or materials.

In the present invention, the plastic box for containing a sushi product is used with a laminated metal foil placed on its bottom and, to permit the inside of the box to be vacuumed, with no covering. The sushi product is placed in the box with the sushi material or materials down, i.e., upside down so that the sushi material or materials are in contact with the laminated metal foil. When the sushi product is placed in the box with the sushi material or materials down as described above, the sushi material or materials are rested on the laminated metal foil disposed on the bottom of the box to cover a surface or surfaces of the sushi material or materials with the laminated metal foil. On the other hand, the shaped rice section of the sushi product to be contained in the box is placed facing up with no cover thereon in the plastic box. The plastic box in which the sushi product is placed in this manner is placed with its top left open in a flexible packing bag made of a plastic film such as a laminated film composed of a polyethylene film and a nylon film. The plastic box which contains the sushi product with the sushi material or materials placed on the laminated metal foil is placed in the packing bag made of a plastic film as described above, and the packing bag is vacuumed to a pressure in a range of 50 to 600 mmHg, preferably 150 to 400 mmHg. When the packing bag is vacuumed, the packing bag collapses under atmospheric pressure, and the inner surface of the packing bag is brought into tight contact with the shaped rice section to enable the sushi product to be held fixedly in the box. The covering of the sushi material or materials with the laminated metal foil such as a laminated aluminum foil is freeze-immobilized by brine freezing subsequent to the vacuum-packing, and accordingly, the covering of the sushi material or materials with the laminated metal foil undergoes no detachment during the thawing. In the present invention, since the laminated metal foil such as a laminated aluminum foil, in which a metal foil is covered with an insulating material, is used, it may be used as it is on the sushi material or materials for screening the sushi material or materials from microwaves. Further, since the flexible packing bag made of a plastic film easily collapses and is brought into tight contact with the sushi product to hold the sushi product at a fixed position when vacuumed, the position of the sushi product is stable and thus the shaped rice section undergoes no dislocation relative to the (laminated) metal foil during freezing or thawing by means of a microwave oven.

According to the present invention, a sushi product is so prepared that a shaped rice section is topped with a sushi material or materials, and the thus prepared sushi product is placed with the sushi material or materials down in a box with a laminated metal foil placed on its bottom to bring the sushi material or materials in contact with the laminated metal foil, and the box which contains the sushi product is placed in a flexible plastic packing bag, and the packing bag is vacuumed and hermetically sealed to bring the inner surface of the flexible plastic packing bag in tight contact with the sushi product, whereby the sushi product contained in the box is fixedly held in the box, and the vacuum-packed sushi product is brought in contact with a refrigerant cooled to a freezing temperature to freeze the inside of the packing bag of the vacuum-packed sushi product together with the sushi product. Accordingly, the procedure to prepare the frozen packed sushi product can be performed almost mechanically with no substantial manual intervention and thus easily automatized to enable hygienic mass production. Accordingly, frozen packed sushi products of high quality can regularly be prepared. Further, in the present invention, the frozen packed sushi product may be prepared by topping a shaped rice section with a sushi material or materials to prepare a sushi product, placing a laminated metal foil over the thus prepared sushi product to cover the sushi material or materials, placing the sushi product with the laminated metal foil thereon and with the sushi material or materials down in a plastic box, placing the sushi product in a flexible plastic packing bag together with the box, vacuuming the packing bag, and freezing the resultant.

EXAMPLES

Embodiments of the present invention will be described hereinbelow with reference to the accompanying drawings. It should be noted, however, that the present invention is by no means restricted by the following description or Examples.

FIG. 1 is a schematic partially cutaway sectional front view schematically illustrating one Embodiment of the present invention.

Figure 2:
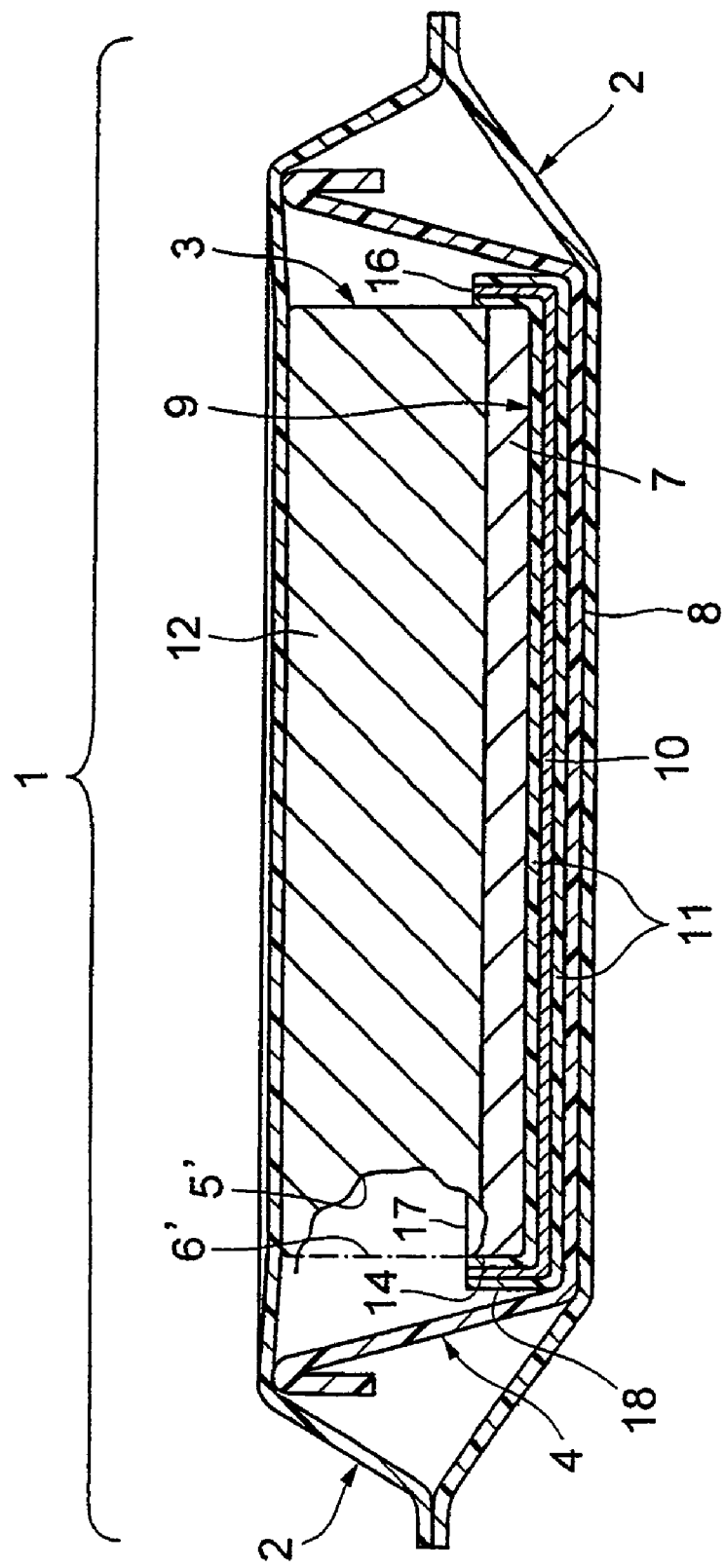
FIG. 2 is a schematic sectional side view schematically illustrating the Embodiment shown in FIG. 1.

FIG. 2 is a schematic sectional side view schematically illustrating the Embodiment shown in FIG. 1.

Figure 3:
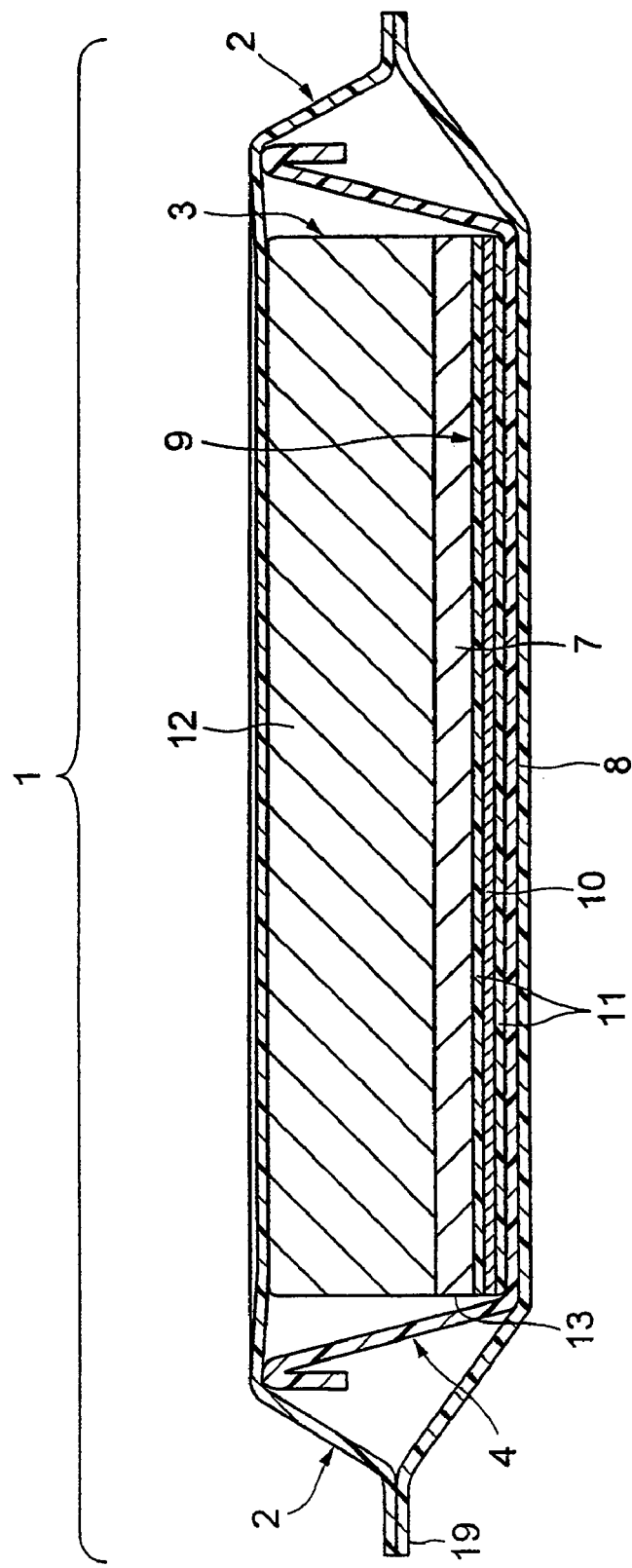
FIG. 3 is a schematic sectional front view schematically illustrating another Embodiment of the present invention which is different from the Embodiment shown in FIGS. 1 and 2.

FIG. 3 is a schematic sectional front view schematically illustrating another Embodiment of the present invention which is different from the Embodiment shown in FIGS. 1 and 2.

Figure 4:
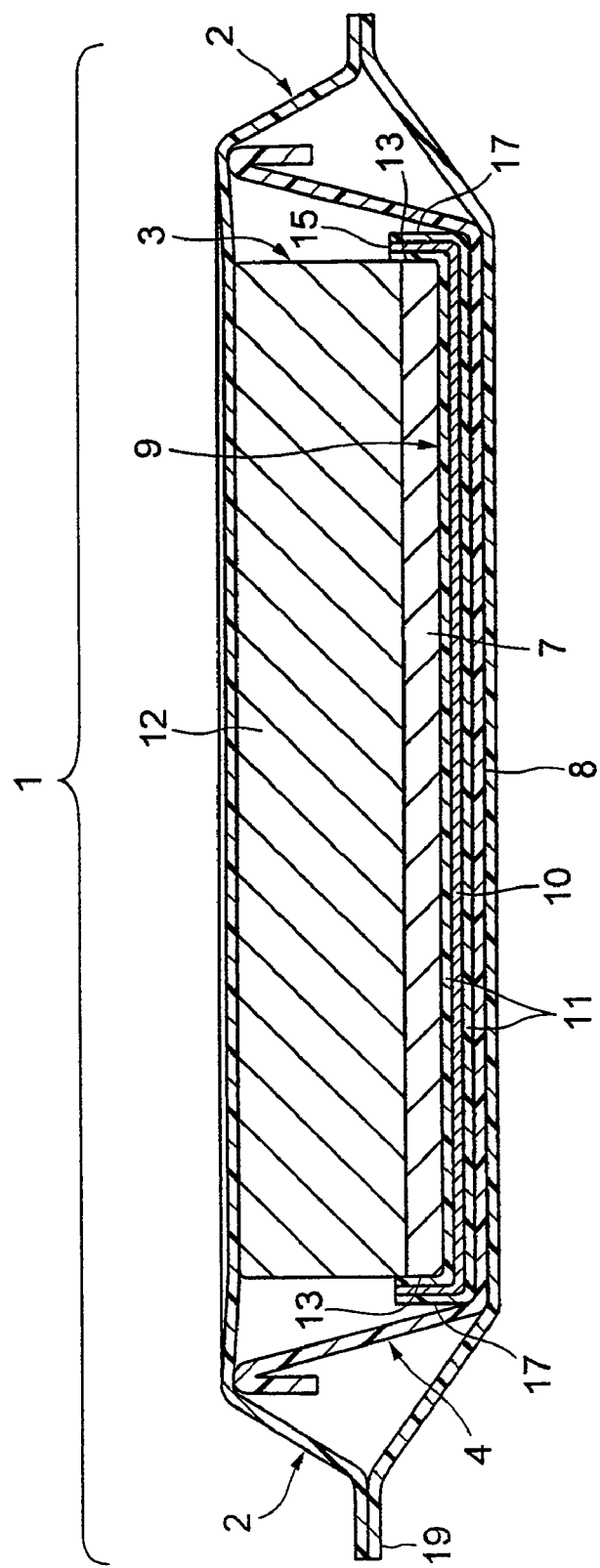
FIG. 4 is a schematic sectional front view schematically illustrating still another Embodiment of the present invention which is different from the Embodiments shown in FIGS. 1 to 3.

FIG. 4 is a schematic sectional front view schematically illustrating still another Embodiment of the present invention which is different from the Embodiments shown in FIGS. 1 to 3.

Figure 5:
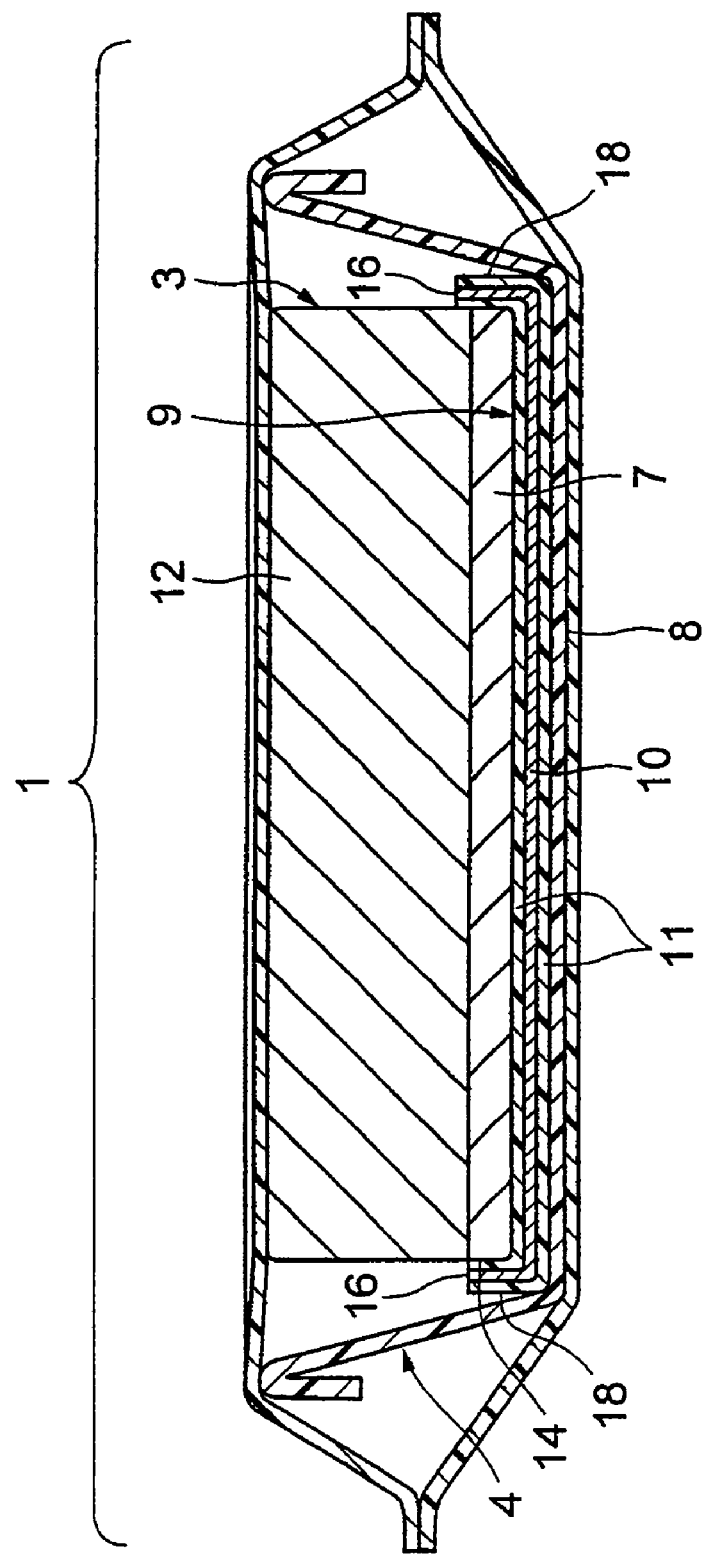
FIG. 5 is a schematic sectional side view schematically illustrating a further Embodiment of the present invention which is different from the Embodiments shown in FIGS. 1 to 4.

FIG. 5 is a schematic sectional side view schematically illustrating a further Embodiment of the present invention which is different from the Embodiments shown in FIGS. 1 to 4.

Figure 6:
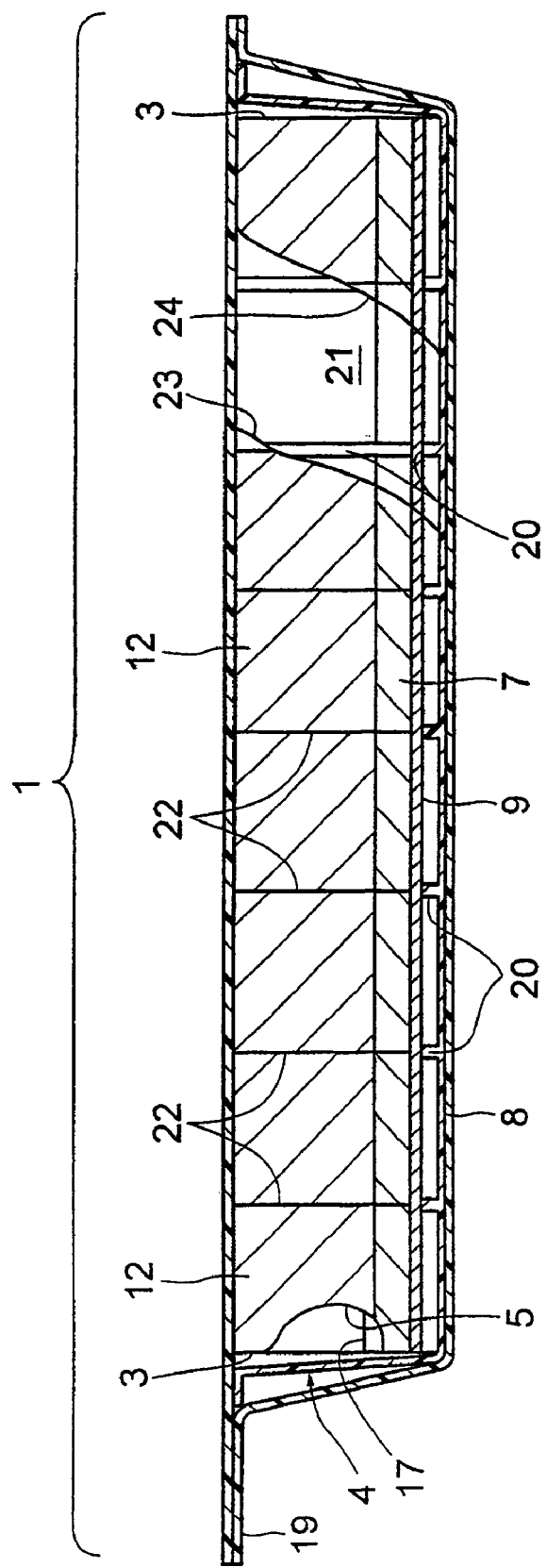
FIG. 6 is a schematic sectional front view schematically illustrating a still further Embodiment of the present invention which is different from the Embodiments shown in FIGS. 1 to 5.

FIG. 6 is a schematic sectional front view schematically illustrating a still further Embodiment of the present invention which is different from the Embodiments shown in FIGS. 1 to 5.

Figure 7:
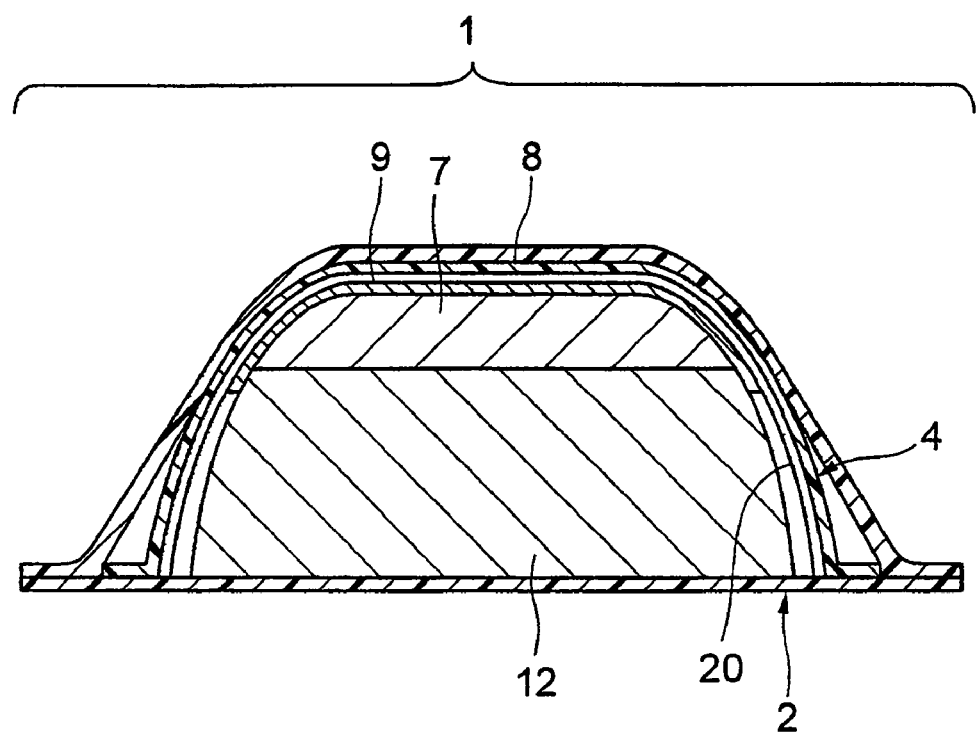
FIG. 7 is a schematic sectional side view schematically illustrating the Embodiment shown in FIG. 6.

FIG. 7 is a schematic sectional side view schematically illustrating the Embodiment shown in FIG. 6.

In the Embodiment shown in FIG. 1, a packed frozen sushi product 1 has a plastic packing bag 2 as an outer covering, and a plastic box 4 containing a sushi product 3 is contained in the plastic packing bag 2, and in a condition where the plastic packing bag is vacuumed, the inside of the plastic packing bag as a whole is frozen together with the sushi product 3 in a unified form. In FIG. 1, the sushi product 3 has its left portion cut away along a cutting line 5, and the end of the cutaway portion of the sushi product is shown in a dash-dotted line 6. In this Embodiment, in order to prevent the sushi material or materials 7 of the sushi product 3 from being heated with microwaves by means of a microwave oven, a laminated metal foil 9 is placed on the bottom 8 of the above-mentioned plastic box 4, and thereon, the sushi product 3 is placed with its sushi material or materials 7 down. In this Embodiment, the packed frozen sushi product 1 is such that in the plastic packing bag 2, the plastic box 4, the sushi product 3 and the laminated metal foil 9 are frozen together with the plastic packing bag 2 in a unified form. In this Embodiment, the laminated metal foil 9 used in the frozen packed sushi product 1 has its metal foil 10 almost entirely covered with a plastic film 11 and may be prepared by cutting a sheet of so-called laminated metal foil 9. In this Embodiment, in the box 4, the sushi product 3 is placed with its sushi material or materials 7 on the so-called laminated metal foil 9 and with its shaped rice section 12 on the sushi material or materials 7.

In this Embodiment, both side ends 13 and front (and rear) ends 14 of the sushi material or materials 7 of the sushi product 3 are covered with the laminated metal foil 9. The laminated metal foil 9 is so formed as to have a width and a length which are larger than those of the bottom 8 of the plastic box 4. The laminated metal foil 9 has its front (and rear) peripheral portions 15 and side peripheral portions 16 upward bent so that these portions can upward extend when the laminated metal foil 9 is placed on the bottom 8 of the plastic box 4. The side peripheral portions 15 of the laminated metal foil 9 constitute bent portions 17, and the side and front (and rear) peripheral portions 16 constitute bent portions 18. In this Embodiment, the sushi product 3 placed in the plastic box 4 has its side ends 13 of the sushi material or materials 7 covered with the bent portions 17 formed by the side peripheral portions 15 of the laminated metal foil 9 placed on the bottom of the box 4 and has its front (and rear) ends 14 of the sushi material or materials 7 covered with the bent portions 18 formed by the side (front and rear) peripheral portions 16 of the laminated metal foil 9 placed on the bottom of the plastic box 4. In thawing by means of a microwave oven, microwaves emitted sideways toward the side ends 13 and the front (and rear) ends 14 of the sushi material or materials 7 of the sushi product 3 are blocked by the side bent portions 17 and the front (and rear) bent portions 18 of the laminated metal foil 9 to thereby prevent the sushi material or materials 7 of the sushi product 3 from being heated with the sideward microwaves.

In this Embodiment, in the packed frozen sushi product 1, the laminated metal foil 9 is placed on the bottom 8 of the plastic box 4, and thereon, the sushi product 3 is placed with its sushi material or materials 7 down. After the sushi product 3 is placed in the plastic box 4, the plastic box 4 which contains the sushi product 3 is placed in the flexible plastic packing bag 2. A mouth 19 of the packing bag 2 is connected to a suction port of a vacuum pump (neither of them is shown), and the plastic packing bag 2 is vacuumed under a pressure of, for example, 160 mmHg. After completion of the vacuuming, the mouth 19 of the packing bag 2 is hermetically closed by heat-sealing. The sushi product 3 packed and hermetically sealed in the plastic packing bag 2 is soaked, together with the plastic packing bag 2, in an ethanol brine refrigerant to freeze the plastic packing bag and its contents en bloc in a unified form, whereby the packed frozen sushi product 1 is prepared.

Since this Embodiment is constructed as described above, the packed frozen sushi product 1 can be thawed in a microwave oven with its shaped rice section 12 up, in other words, with its sushi material or materials 7 down. Alternatively, the packed frozen sushi product may be thawed with the shaped rice section 12 down and the sushi material or materials 7 up, i.e., with the box turned upside down. When thawing is performed in a microwave oven with the shaped rice section 12 up, microwaves from above are absorbed almost in the shaped rice section and energy thereof is expended substantially in heating the shaped rice section, and the microwaves are thereby prevented from reaching the sushi material or materials, and the sushi material or materials 7 are substantially prevented from being heated. On the other hand, when thawing is performed with the sushi material or materials 7 up, i.e., with the box turned upside down, microwaves from above are almost blocked by the laminated aluminum foil, and the sushi material or materials 7 are prevented from being heated.

In this Embodiment, the laminated metal foil 9 placed on the bottom of the plastic box 4 provides the bent portions 17 for the side ends 13 of the sushi material or materials and the bent portions 18 for the front (and rear) ends 14 of the sushi material or materials to block the microwaves emitted sideways toward the side ends and the front (and rear) ends of the sushi material or materials 7 of the sushi product 3 by means of these bent portions 17 and 18, whereby the sushi material or materials 7 of the sushi product 3 are prevented from being heated with the sideward microwaves. In this connection, the sideward microwaves are scattered light rays, and besides, the sushi material or materials 7 of the sushi product 3 have small thicknesses, and the rice is present adjacent to the sushi material or materials. Accordingly, the sushi material or materials of the sushi product 3 are not heated to such a degree as to have high temperatures exceeding 10° C. immediately after the thawing. In the following, specific Examples of this Embodiment will be given.

Example 1

1400 ml of seasoned vinegar (sushi vinegar) was added in 13 kg of cooked rice, followed by mixing to uniformly vinegar the rice. Then, the thus vinegared rice was cooled to 50° C. Using 240 g of the rice vinegared and cooled to 50° C. and slices of mackerel as a sushi material, each of mackerel-topped boxed sushi products of 5.5 cm in width, 18 cm in length and 3 cm in thickness (L size) and 320 g in weight was prepared. The mackerel-topped boxed sushi product was taken out of a sushi box for making a boxed sushi product and placed with its slices of mackerel as a sushi material down in a plastic box on the bottom of which a laminated aluminum foil is placed. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width and 19.5 cm in length. The box used in this Example had a reversed truncated rectangular pyramidal shape, i.e., reversed kamaboko-like shape, and it had inner dimensions of 6.2 cm in width and 18.2 cm in length in the bottom, and 6.2 cm in width and 19.2 cm in length in the top opening, and 3.0 cm in depth, and the box had a volume of 334.5 cm$^3$. A volume of a space was 45 cm$^3$ and the volume ratio of the space to the sushi product was 0.15. In this Example, the box which contained the sushi product was placed in a flexible packing bag made of a laminated film composed of a polyethylene film as an inner layer and a nylon film as an outer layer, and the packing bag was vacuumed by a vacuum pump under a pressure of 16 cmHg, i.e., 160 mmHg and had its mouth hermetically closed by heat-sealing. In the vacuumed packing bag, its top portion was depressed and in tight contact with the shaped rice section of the sushi product, and peripheral portions of the laminated aluminum foil were so raised as to extend upward and adhered to peripheral sides of the sushi material in such a manner that the peripheral sides of the sushi material were covered therewith.

The packing bag, in which the boxed sushi product having a top surface of its sushi material covered with the laminated aluminum foil at the bottom of the plastic box had been placed together with the box and then packed and which had been heat-sealed, was kept in ethyl alcohol having a temperature of −35° C. as a brine for 45 minutes and thereby brine-frozen to obtain a vacuum-packed frozen mackerel-topped sushi product (L size). In the vacuum-packed mackerel-topped frozen sushi product (L size), the plastic packing bag as an outer covering, the plastic box and the mackerel-topped sushi product as contents thereof were frozen together in a unified form.

The vacuum-packed frozen mackerel-topped sushi products (L size) were stored at a temperature of −19.1° C. on average.

In cooking the vacuum-packed frozen mackerel-topped sushi product (L size), a 500 W microwave oven was used. The vacuum-packed frozen mackerel-topped sushi product (L size) of this Example was placed in the 500 W microwave oven with the bottom of the box up and thawed by applying heat for 4.5 minutes. After a lapse of 4.5 minutes, which was the same as the time of thawing by the microwave oven, the resulting vacuum-packed frozen sushi product was removed from the microwave oven and allowed to stand at room temperature for 30 minutes to effect steaming. In this Example, with respect to the exposed rice section of the sushi product which had been heated by the microwave oven, temperatures of its "portion at the center in the width direction and 1 cm inner from the end in the longitudinal direction in the exposed surface of the rice section on which no sushi material was placed, i.e., the under surface of the rice section" (in Table 1, referred to as end portion in the under surface of the rice section) and temperatures of its "portion at the center in the width direction and the center in the longitudinal direction in the surface on which no sushi material was placed, i.e., the under surface of the rice section" (in Table 1, referred to as center portion in the under surface of the rice section) were measured immediately after the thawing (immediately after the heating by the microwave oven), immediately after a lapse of 15 minutes in the steaming, and immediately after a lapse of 30 minutes for the steaming. Also, with respect to the sushi material of the thawed sushi product, temperatures of its "portion at the center in the width direction and 1 cm inner from the end in the longitudinal direction in the aluminum foil-side surface of the sushi material" (in Table 1, referred to as end portion in the aluminum foil-side surface of the sushi material), temperature of its "portion at the center in the width direction and the center in the longitudinal direction in the aluminum foil-side surface of the sushi material" (in Table 1, referred to as center portion in the aluminum foil-side surface of the sushi material), temperatures of its "portion at the center in the width direction and 1 cm inner from the end in the longitudinal direction in the rice-side surface of the sushi material" (in Table 1, referred to as end portion in the rice-side surface of the sushi material), and temperatures of its "portion at the center in the width direction and the center in the longitudinal direction in the rice-side surface of the sushi material" (in Table 1, referred to as center portion in the rice-side surface of the sushi material) were measured immediately after the thawing, immediately after a lapse of 15 minutes in the steaming, and immediately after a lapse of 30 minutes for the steaming. The results are shown in Table 1.

TABLE 1

| | Steaming time after thawing | | |
|---|---|---|---|
| | Immediately after thawing ° C. | Immediately after lapse of 15 minutes in steaming ° C. | Immediately after lapse of 30 minutes in steaming ° C. |
| End portion in the under surface of the rice section | 83.0 | 42.5 | 30.5 |
| Center portion in the under surface of the rice section | 56.3 | 27.1 | 23.6 |
| End portion in the aluminum foil-side surface of the sushi material | 20.7 | 21.8 | 26.7 |
| Center portion in the aluminum foil-side surface of | 4.2 | 10.2 | 17.4 |

TABLE 1-continued

| | Steaming time after thawing | | |
| --- | --- | --- | --- |
| | Immediately after thawing °C. | Immediately after lapse of 15 minutes in steaming °C. | Immediately after lapse of 30 minutes in steaming °C. |
| the sushi material | | | |
| End portion in the rice-side surface of the sushi material | — | 26.3 | 23.2 |
| Center portion in the rice-side surface of the sushi material | — | 19.3 | 19.9 |

In Table 1, with respect to the boxed sushi product, it is seen that immediately after the thawing, the temperature of the end portion in the under surface of the rice section was about 27 degrees Centigrade different from that of the center portion in the under surface of the rice section and about 79 degrees Centigrade different from that of the center portion in the aluminum foil-side surface of the sushi material. At the time when the sushi product was steamed for 15 minutes, however, the temperature of the end portion in the under surface of the rice section was about 15 degrees Centigrade different from that of the center portion in the under surface of the rice section and about 32 degrees Centigrade different from that of the center portion in the aluminum foil-side surface of the sushi material. Further, at the time when the sushi product was steamed for 30 minutes, the temperature of end portion in the under surface of the rice section was about 7 degrees Centigrade different from that of the center portion in the under surface of the rice section and about 13 degrees Centigrade different from the center portion in the aluminum foil-side surface of the sushi material, and the temperatures of the shaped rice section and the sushi material of the sushi product were within a temperature range of approximately 10 to 20° C., and the boxed sushi product became easy-to-cut with a kitchen knife.

Example 2

The mackerel-topped boxed sushi product (L size) prepared in Example 1 was used. As in Example 1, the mackerel-topped boxed sushi product (L size) was taken out of a sushi box for making a boxed sushi product and placed with its slices of mackerel as a sushi material down in a plastic box on the bottom of which a laminated aluminum foil is placed. In this Example, the laminated aluminum foil used was composed of a polyethylene terephthalate (PET) layer having a thickness of 12 μm as a top layer, and thereunder, an aluminum layer having a thickness of 9 μm, and thereunder, a polypropylene layer as used in a retort pouch and having a thickness of 70 μm, and the laminated aluminum foil measured 6.5 cm in width and 19.5 cm in length. The box used in this Example had a reversed truncated rectangular pyramidal shape, i.e., reversed kamaboko-like shape, and it had inner dimensions of 6.2 cm in width and 18.2 cm in length in the bottom, and 6.2 cm in width and 19.2 cm in length in the top opening, and 3.0 cm in depth, and the box had a volume of 334.5 cm³. A volume of a space was 45 cm³ and the volume ratio of the space to the sushi product was 0.15. In this Example, the box which contained the sushi product was placed in a flexible packing bag made of a laminated film composed of a polyethylene film as an inner layer and a nylon film as an outer layer, and the packing bag was vacuumed by a vacuum pump under a pressure of 16 cmHg, i.e., 160 mmHg and had its mouth hermetically closed by heat-sealing. In the vacuumed packing bag, its top portion was depressed and in tight contact with the shaped rice section, and peripheral portions of the laminated aluminum foil were so raised as to extend upward and adhered to peripheral sides of the sushi material in such a manner that the peripheral sides of the sushi material were covered therewith.

The packing bag, in which the boxed sushi product having a top surface of its sushi material covered with the laminated aluminum foil at the bottom of the plastic box had been placed together with the box and then packed and which had been heat-sealed, was kept in ethyl alcohol having a temperature of −35° C. as a brine for 45 minutes and thereby brine-frozen to obtain a vacuum-packed frozen mackerel-topped sushi product (L size). In the vacuum-packed mackerel-topped frozen sushi product (L size), the plastic packing bag as an outer covering, the plastic box and the mackerel-topped sushi product as contents thereof were frozen together in a unified form. The vacuum-packed frozen mackerel-topped sushi products (S size) were stored at a temperature of −19.1° C. on average.

In cooking the vacuum-packed frozen mackerel-topped sushi product (L size), a 500 W microwave oven was used. The vacuum-packed frozen mackerel-topped sushi product (L size) of this Example was placed in the 500 W microwave oven with the bottom of the box up and thawed by applying heat for 4.5 minutes. After a lapse of 4.5 minutes, which was the same as the time of thawing by the microwave oven, the resulting vacuum-packed frozen sushi product was removed from the microwave oven and allowed to stand in a room at a room temperature of 17.7 for 10 minutes and then allowed to stand in water at a water temperature of 14.7° C. to effect steaming. In this Example, with respect to the exposed rice section of the sushi product which had been heated by the microwave oven, temperatures of its "portion at the center in the width direction and 1 cm inner from the end in the longitudinal direction in the exposed surface of the rice section on which no sushi material was placed (in the microwave oven), i.e., the under surface of the rice section" (in Table 2, referred to as end portion in the under surface of the rice section) and temperatures of its "portion at the center in the width direction and the center in the longitudinal direction in the surface on which no sushi material was placed, i.e., the under surface of the rice section" (in Table 2, referred to as center portion in the under surface of the rice section) were measured immediately after the thawing (immediately after the heating by the microwave oven), immediately after a lapse of 10 minutes for the steaming in a room, immediately after a lapse of 3 minutes in the steaming in water, and immediately after a lapse of 5 minutes for the steaming in water. Also, with respect to the sushi material of the thawed sushi product, temperatures of its "portion at the center in the width direction and 1 cm inner from the end in the longitudinal direction in the aluminum foil-side surface of the sushi material" (in Table 2, referred to as end portion in the aluminum foil-side surface of the sushi material), temperature of its "portion at the center in the width direction and the center in the longitudinal direction in the aluminum foil-side surface of the sushi material" (in Table 1, referred to as center portion in the aluminum foil-side surface of the sushi material), temperatures of its "portion at the center in the width direction and 1 cm inner from the end in the longitudinal direction in the rice-side surface of the sushi material" (in Table 2, referred to as end portion in the rice-side surface of the sushi material), and temperatures of its "portion at the center in the width direction and the center in the longitudinal direction in the rice-side surface of the sushi material" (in Table 2, referred to as center portion in the rice-side surface of the sushi material) were measured immediately after the thawing, immediately after a lapse of 10 minutes for the steaming in a room, immediately after a lapse of 3 minutes in the steaming in water, and immediately after a lapse of 5 minutes for the steaming in water. The results are shown in Table 2.

TABLE 2

|  | Steaming time after thawing | | | |
| --- | --- | --- | --- | --- |
|  | Immediately after thawing ° C. | 10 minutes in room ° C. | 3 minutes in water ° C. | 5 minutes in water ° C. |
| End portion in the under surface of the rice section | 82.8 | 53.4 | 25.9 | 25.1 |
| Center portion in the under surface of the rice section | 56.1 | 37.6 | 18.9 | 18.3 |
| End portion in the aluminum foil-side surface of the sushi material | 20.5 | 18.2 | 20.0 | 21.8 |
| Center portion in the aluminum foil-side surface of the sushi material | 4.0 | 7.5 | 10.0 | 12.9 |
| End portion in the rice-side surface of the sushi material | — | 33.5 | 24.6 | 21.6 |
| Center portion in the rice-side surface of the sushi material | — | 12.2 | 14.2 | 15.8 |

In Table 2, with respect to the boxed sushi product, it is seen that immediately after the thawing, the temperature of the end portion in the under surface of the rice section was about 27 degrees Centigrade different from that of the center portion in the under surface of the rice section and about 79 degrees Centigrade different from that of the center portion in the aluminum foil-side surface of the sushi material. At the time when the sushi product was steamed for 10 minutes, however, the temperature of the end portion in the under surface of the rice section was about 16 degrees Centigrade different from that of the center portion in the under surface of the rice section and about 46 degrees Centigrade different from that of the center portion in the aluminum foil-side surface of the sushi material. Further, at the time when the sushi product was steamed for 3 minutes in water, the temperature of end portion in the under surface of the rice section was about 7 degrees Centigrade different from that of the center portion in the under surface of the rice section and about 16 degrees Centigrade different from the center portion in the aluminum foil-side surface of the sushi material. Furthermore, at the time when the sushi product was steamed for 5 minutes in water, the temperature of end portion in the under surface of the rice section was about 7 degrees Centigrade different from that of the center portion in the under surface of the rice section and about 12 degrees Centigrade different from the center portion in the aluminum foil-side surface of the sushi material. The temperatures of the shaped rice section and the sushi material of the sushi product were within a temperature range of approximately 10 to 20° C., and the boxed sushi product became easy-to-cut with a kitchen knife.

In the Embodiment shown in FIG. 3, a packed frozen sushi product 1 has a plastic packing bag 2 as an outer covering and a plastic box 4 containing a sushi product 3 contained in the plastic packing bag 2, and the inside thereof as a whole in a vacuumed condition is frozen together with the sushi product 3 in a unified form, as in the Embodiment shown in FIGS. 1 and 2. In this Embodiment, in order to shield a sushi material or materials 7 from microwaves emitted by a microwave oven with a laminated metal foil 9 and to thereby prevent the sushi material or materials 7 from being heated with the microwaves during thawing of the sushi product 3 by the microwave oven, the sushi product 3 is placed with its sushi material or materials 7 down on the laminated metal foil 9 placed on the bottom 8 of the plastic box 4. In this Embodiment, the packed frozen sushi product 1 is such that in the plastic packing bag 2, the plastic box 4, the sushi product 3 and the laminated metal foil 9 are frozen together with the plastic packing bag 2 in a unified form. In this Embodiment, in the laminated metal foil 9 used in the frozen packed sushi product 1, its metal foil 10 is in whole covered with a plastic film 11 to form a so-called laminated metal foil 9. This Embodiment is different form the Embodiment shown in FIGS. 1 and 2 in that the laminated metal foil 9 is provided with no bent portions 17 or 18 in its side peripheral portions and front (and rear) peripheral portions. With respect to other points, this Embodiment is the same as the Embodiment shown in FIGS. 1 and 2.

In this Embodiment, in the packed frozen sushi product 1, the laminated metal foil 9 is placed on the bottom 7 of the plastic box 4, and thereon, the sushi product 3 is placed with its sushi material or materials 7 down. After the sushi product 3 is placed in the plastic box 4, the plastic box 4 which contains the sushi product 3 is placed in the flexible plastic packing bag 2. A mouth 19 of the packing bag is connected to a suction port of a vacuum pump (neither of them is shown), and the inside of the plastic packing bag 2 is vacuumed under a pressure of, for example, 160 mmHg or lower. After completion of the vacuuming, the mouth 11 of the packing bag is hermetically closed by heat-sealing. The sushi product packed and hermetically sealed in the plastic packing bag is soaked, together with the plastic packing bag, in an ethanol brine refrigerant to freeze the plastic packing bag and its contents en bloc in a unified form, whereby the packed frozen sushi product 1 is prepared.

Since this Embodiment is constructed as described above, the packed frozen sushi product 1 may be thawed in a microwave oven with its shaped rice section 12 up. Alternatively, the packed frozen sushi product may be thawed with the shaped rice section 12 down and the sushi material or materials 5 up. When thawing is performed in a microwave oven with the shaped rice section 10 up, microwaves from above are almost absorbed in the shaped rice section and energy thereof is expended substantially in heating the shaped rice section, and the microwaves are thereby prevented from reaching the sushi material or materials of the sushi product, and the sushi material or materials 7 of the sushi product 3 are substantially prevented from being heated. In this connection, the sideward microwaves are scattered light rays, and besides, the sushi material or materials 7 of the sushi product 3 have small thicknesses and thus areas derived form the thicknesses which are irradiated with the sideward microwaves are small, and the rice is present adjacent to the sushi material or materials. Accordingly, the sushi material or materials of the sushi product 3 are not heated to such a degree as to have high temperatures exceeding 10° C.

The Embodiment shown in FIG. 4 is a case where taking it into consideration that temperatures of front (and rear) sides of a sushi product are considerably elevated as compared with that of a center portion of the sushi product by heating of the sushi product by a microwave oven, in order to cover both ends of a sushi material or materials 7 of the sushi product 3, i.e., front (and rear) sides 13 of the sushi material or materials 7 of the sushi product 3 with a laminated metal foil 6, the laminated metal foil 6 is so formed as to have a longitudinal dimension larger than that of a bottom of a plastic box 4, and when the laminated metal foil 6 is placed on the bottom of the plastic box 4, front (and rear) peripheral portions 15 of the laminated metal foil 9 are upward bent along front (and rear) walls 16 of the plastic box to form bent portions 17 of the laminated metal foil 9. This Embodiment is different from those shown in FIGS. 1 and 2 (and FIG. 3) in this point. With respect to other points, however, this Embodiment is the same as those shown in FIGS. 1 and 2 and FIG. 3. In this Embodiment, when the sushi product 3 is placed in the plastic box, the front (and rear) sides 13 of the sushi material or materials 7 of the sushi product 3 placed in the box 4 are covered with the bent portions 17 formed by the front (and rear) peripheral portions 15 of the laminated metal foil 9 placed on the bottom of the plastic box. In consequence, microwaves sideways emitted toward the front (and rear) sides of the sushi material or materials 7 are blocked by the bent portions 17 to prevent the front (and rear) sides of the sushi material or materials 5 from being heated by the sideward microwaves.

The Embodiment shown in FIG. 5 is a case where when the laminated metal foil 9 is placed on a bottom of a plastic box 4, side peripheral portions 15 of the laminated metal foil 9 are upward bent along side walls of the plastic box 4 to form bent portions 17 in the sides of the laminated metal foil 9. With exception of this point, this Embodiment is the same as the Embodiment shown in FIG. 1 in other points. In this Embodiment, when a sushi product 3 is placed in the plastic box 4, side ends 14 of a sushi material or materials 7 of the sushi product 3 placed in the box are covered with the front (and rear) bent portions 20 formed by the side peripheral portions 18 of the laminated metal foil 9 placed on the bottom 8 of the plastic box 4. In consequence, microwaves sideways emitted toward the side ends 14 of the sushi material or materials 5 of the sushi product 3 are blocked by the bent portions 20 to prevent the side ends of the sushi material or materials 7 of the sushi product 3 from being heated by the sideward microwaves.

In FIGS. 6 and 7, the Embodiment different from those shown in FIGS. 1 to 5 is shown. In the Embodiment shown in FIGS. 6 and 7, a box 4 has a reversed semicylindrical shape, i.e., reversed kamaboko-like shape and is made of a polypropylene. As shown in FIG. 7, the box 4 has a cross-section of reversed semicircular shape, i.e., reversed kamaboko-like cross-section. In this Embodiment, the sectional side shape is of the sushi product with its sushi material or materials 7 placed on the bottom of the box is so formed as to substantially conform with the cross-sectional shape of the container. In this Embodiment, the plastic box 4 for containing the packed frozen sushi product 1 is formed with seven ribs 20 along its inner walls which inward protrude from the inner walls with a view to reinforcing the box 4 and maintaining the shape of the box 4. The sushi product may be contained in the box in such a manner that it is placed on the ribs 20 through the spaces 21 between the ribs 20 with its sushi material or materials 7 down and shaped rice section 12 thereon.

Alternatively, the sushi product may be cut into pieces and each of the pieces may be placed in the spaces 21 between the ribs 20 so that each rib 20 serves as a partition. In this Embodiment, the rod-shaped sushi product or boxed sushi product is contained in the box 4 in such a manner that it is precut along cut lines 22 so as to be separable into 8 pieces (afterward) and placed on the ribs 20. In FIG. 6, the ribs 20 and the space 21 between the ribs 20 are shown with no sushi product is contained in the space between cutting lines 23 and 24. Of course, in this Embodiment, the box may be used as a container for an uncut rod-shaped sushi product or boxed sushi product. In this Embodiment, the ribs are provided on the inside of the box. However, the ribs may be provided on the outside of the box.

INDUSTRIAL APPLICABILITY

In the present invention, since a laminated metal foil is placed on a bottom of a plastic box and a sushi product is placed thereon with a sushi material or materials down and in contact with the laminated metal foil, alignment between the position of the sushi material or materials and that of the laminated metal foil is simple and easy. Accordingly, the sushi product can be mass-produced mechanically and efficiently. This enables inexpensive boxed sushi products to be provided.

Further, in the vacuum-packed frozen sushi product of the present invention, the space formed between the sushi product, the box and the packing bag is a space having a reduced pressure of 50 to 600 mmHg. Accordingly, the rice section can be heated to a temperature of 50° C. or higher in a relatively short period of time by a microwave oven, and by such a simple procedure that the resultant is allowed to stand in a room or allowed to stand in water, the vacuum-packed frozen sushi product can be thawed easily in a short time. This enables the boxed sushi product to be eaten with ease.

As described above, the vacuum-packed frozen sushi product of the present invention can be cooked simply and easily, and without need of any special technique, for example, by storing a sushi product using a seasonal sushi material or materials in the form of a vacuum-packed frozen sushi product, a sushi product which is hygienically safe can be served as occasion arises Therefore, the vacuum-packed frozen sushi product is industrially beneficial.

The invention claimed is:

1. A microwavable vacuum-packed frozen sushi product configured for controlled thawing of a frozen sushi food contained therein, to 10° C. to 30° C., comprising:
    a flexible plastic packing bag which is vacuumed to a pressure of 150 to 350 mmHg and, in the pressure-reduced state, hermetically sealed;
    an open-topped plastic box, the top opening of which is formed so as to be broader than a bottom of the plastic box, placed in the plastic packing bag;
    a laminated metal foil placed on the bottom of the plastic box; and
    a frozen sushi food product which is formed by at least one shaped form of frozen boiled rice and a frozen sushi food material or sushi food materials on a surface of each form of at least one shaped form of frozen boiled rice, placed on the laminated metal foil and having its sushi food material or sushi food materials in contact with the laminated metal foil, the microwaveable vacuum-packed frozen sushi product being configured to substantially prevent the frozen sushi food material from being cooked by microwaves to a temperature above 40° C. when the hermetically sealed frozen sushi product is microwaved and wherein the frozen boiled rice is configured to be cooked by microwaves to a temperature of at least 50° C., on an end portion surface thereof, to generate heated water vapor;
    the microwavable vacuum-packed frozen sushi product being configured such that microwave heating of the frozen sushi food product heats an end portion surface of the frozen boiled rice to a temperature of at least 50° C., at which time the frozen sushi food product is removed from the microwave heating and wherein the heated rice provides heated water vapor which substantially evenly heats and thaws the sushi food material to a temperature between 10° C. and 30° C., the microwaveable vacuum-packed frozen sushi product being configured to provide the thawing of the sushi food material with an inner surface of the plastic packing bag being in contact with a rice section of the sushi food product; and the plastic packing bag, the plastic box, the laminated metal foil and the sushi food product being frozen together in a unified form; and with an empty space being formed around the sushi food product in the hermetically sealed packing bag in the pressure-reduced state having a volume 0.2 to 0.5 times that of the sushi food product, the volume of empty space being configured to permit the substantially even steam heating of the sushi food material by the heated water vapor emanating from the shaped rice section and flowing into the empty space between the sushi product and box after microwave heating of the frozen boiled rice is terminated, thereby steaming the shaped rice section and the sushi food material or sushi food materials to a temperature, between 10° C. and 30° C.

2. The vacuum-packed frozen sushi product according to claim 1, wherein the laminated metal foil is provided with portions upward extending from the bottom of the plastic box in the longitudinal direction or the width direction or the longitudinal and width directions and configured to peripherally enclose the frozen sushi food material or materials below the shaped form of frozen boiled rice.

3. The vacuum-packed frozen sushi product according to claim 1, wherein the box is a box-, cylinder-like, tray- or dish-like container having a square shape, a round shape or an ellipse shape when viewed in a plan.

4. The vacuum-packed frozen sushi product according to claim 1, wherein a number of the sushi food product or sushi food products which are placed in the box is one or more.

5. The microwavable vacuum-packed frozen sushi product according to claim 1, wherein the microwave-safe plastic packing bag is made of a laminated film composed of a nylon film and a polypropylene film having a thickness larger than that of the nylon film.

6. A method for cooking the vacuum-packed frozen sushi product of claim 1 by means of a microwave oven, the method comprising:
applying heat to the hermetically sealed vacuum-packed frozen sushi product by microwave heating thereby bring temperatures of exposed sides of the shaped boiled rice section to 50° C. or higher, followed by termination of the microwave heating, the heat being applied substantially only to the shaped boiled rice section and not to the sushi food material or materials; and
having the resulting vacuum-packed sushi product stand in a room or water or stand in a room and then in water within a period of 30 minutes or shorter without unpacking to generate water vapor in the hermetically sealed packing bag, thereby steaming the shaped boiled rice section and the sushi food material or materials to bring temperatures thereof to 10° C. or higher up to room temperature.

7. A method for cooking the vacuum-packed frozen sushi product of claim 2 by means of a microwave oven, the method comprising:
applying heat to the hermetically sealed vacuum-packed frozen sushi product by microwave heating thereby bring temperatures of exposed sides of the shaped boiled rice section to 50° C. or higher, followed by termination of the microwave heating, the heat being applied substantially only to the shaped boiled rice section and not to the sushi food material or sushi food materials; and
having the resulting vacuum-packed sushi product stand in a room or water or stand in a room and then in water within a period of 30 minutes or shorter without unpacking to generate water vapor in the packing bag, thereby steaming the shaped boiled rice section and the sushi material or sushi food materials to bring temperatures thereof to 10° C. or higher up to room temperature.

8. A method for cooking the vacuum-packed frozen sushi product of claim 3 by means of a microwave oven, the method comprising:
applying heat to the hermetically sealed vacuum-packed frozen sushi product by microwave heating thereby bring temperatures of exposed sides of the shaped boiled rice section to 50° C. or higher, followed by termination of the microwave heating, the heat being applied substantially only to the shaped boiled rice section and not to the sushi food material or materials; and
having the resulting packed sushi product stand in a room or water or stand in a room and then in water within a period of 30 minutes or shorter without unpacking to generate water vapor in the hermetically sealed packing bag, thereby steaming the shaped boiled rice section and the sushi material or sushi food materials to bring temperatures thereof to 10° C. or higher up to room temperature.

9. A method for cooking the vacuum-packed frozen sushi product of claim 4 by means of a microwave oven, the method comprising:
applying heat to the hermetically sealed vacuum-packed frozen sushi product by microwave heating thereby bring temperatures of exposed sides of the shaped boiled rice section to 50° C. or higher, followed by termination of the microwave heating, the heat being applied substantially only to the shaped boiled rice section and not to the sushi food material or materials; and
having the resulting packed sushi product stand in a room or water or stand in a room and then in water within a period of 30 minutes or shorter without unpacking to generate water vapor in the hermetically sealed packing bag, thereby steaming the shaped boiled rice section and the sushi material or sushi food materials to bring temperatures thereof to 10° C. or higher up to room temperature.

10. A method for cooking the vacuum-packed frozen sushi product of claim 5 by means of a microwave oven, the method comprising:
applying heat to the hermetically sealed vacuum-packed frozen sushi product by microwave heating thereby bring temperatures of exposed sides of the shaped boiled rice section to 50° C. or higher, followed by termination of the microwave heating, the heat being applied substantially only to the shaped boiled rice section and not to the sushi food material or sushi food materials; and
having the resulting packed sushi product stand in a room or water or stand in a room and then in water within a period of 30 minutes or shorter without unpacking to generate water vapor in the hermetically sealed packing bag, thereby steaming the shaped boiled rice section and the sushi material or sushi food materials to bring temperatures thereof to 10° C. or higher up to room temperature.

11. A method for preparing a vacuum-packed frozen sushi product configured to enable a sushi food material contained therein to be controllably heated to a temperature of between 10° C. and 30° C., the method comprising:

disposing a sushi food material or materials on a top of a shaped rice section to prepare a sushi food product;

placing the prepared sushi food product in a plastic box, in which a laminated metal foil is placed on the bottom thereof, with its sushi food material or materials down so as to put the sushi food material or materials on and in contact with the laminated metal foil;

placing the plastic box containing the sushi food product in a flexible plastic packing bag;

vacuuming the packing bag to a pressure of 150-350 mmHg and hermetically sealing the vacuumed packing bag to prepare a vacuum-packed sushi product with an empty space formed around the sushi food product in the vacuum-packed sushi product in a volume 0.2 to 0.5 times that of the sushi food product; and cooling the vacuum-packed sushi product with a refrigerant cooled to a freezing temperature to freeze the packing bag, the laminated metal foil and the sushi food product of the vacuum-packed sushi product together in a unified form.

12. The method for preparing a vacuum-packed frozen sushi product according to claim 11, wherein the plastic box is a box-, cylinder-like, tray- or dish-like container having a square shape, a round shape or an ellipse shape when viewed in a plan.

* * * * *